L. GREENE.
Smut Machine.
No. 2,291. Patented Oct. 9, 1841.
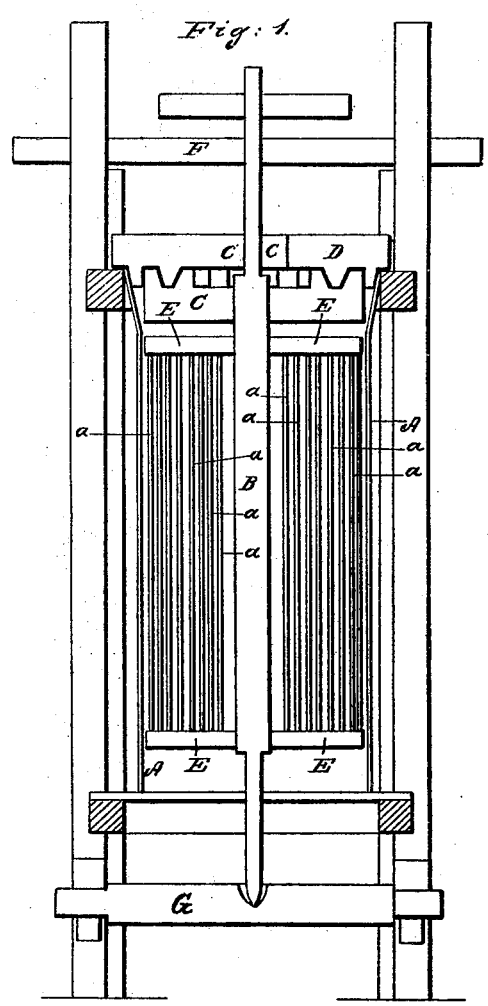
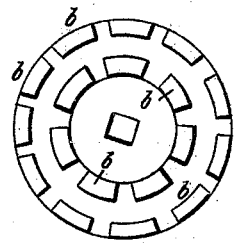

UNITED STATES PATENT OFFICE.

LEWIS GREENE, OF TIFFIN, OHIO.

SMUT-MACHINE.

Specification of Letters Patent No. 2,291, dated October 9, 1841.

*To all whom it may concern:*

Be it known that I, LEWIS GREENE, of Tiffin, in the county of Seneca and State of Ohio, have invented an Improvement in the Manner of Constructing Smut-Machines or Machines for Cleaning Wheat or other Grain; and I do hereby declare that the following is a full and exact description thereof.

I construct a frame which is to sustain a vertical, hollow cylinder, or case, that may be of cast-iron, or other material. Through the center of this cylinder passes a vertical shaft which carries a revolving rubber at its upper end, said rubber consisting of a flat disk of cast-iron having teeth cast upon its upper side, ranged in regular circles, said teeth when set in motion passing between similar rows of teeth on a stationary disk of cast-iron, sustained on the upper end of the cylinder, or case, of the machine. Through an opening in the center of this upper disk, and surrounding the shaft, the grain is to be fed into the machine. The shaft which carries the revolving disk carries also four arms near to its upper, and four others near to its lower end, within the cylinder. These arms extend nearly to the periphery of the cylinder, and sustain iron rods which pass vertically from one of the lower to one of the upper arms; there being four sets of such rods, each set usually consisting of eight rods made of square iron, about half an inch in diameter, and standing at the distance of about half an inch from each other. The shaft carrying these rods, or beaters, is to be made to revolve with great rapidity, say with a speed of four hundred revolutions in a minute, and the grain in falling from the upper to the lower end of the machine, is forcibly beaten by them against the interior of the cylinder, the surface of which is plain, and without perforations.

In the accompanying drawing, Figure 1, is a vertical section of the machine through its center. A, A, is the cylinders, or case, and B, the revolving shaft. C, is the disk attached to said shaft at its upper end, and armed with teeth on its upper side for rubbing the grain. D, is the upper, or stationary, disk between which and the disk C, the rubbing is to be effected.

E, E', are two of the arms, carrying the beaters $a$, $a$, $a$.

Fig. 2, is a top view of the disk C, with the circular rows of teeth $b$, $b$, upon it, which teeth fit into the spaces between similar teeth on the disk D, there being sufficient room between the rows of teeth to admit of the passage of the grain, which is forcibly rubbed in its transit from the feeding opening $c$, $c$, in the middle of the upper disk, until it falls over the edges of the disk C, and is encountered by the beaters. F, is a whirl by which the shaft may be made to revolve, and G, a bridge tree, operating in the usual way. After passing through this machine, the grain is to be cleaned by means of the ordinary fanning mill.

Having thus fully described the manner in which I construct my machine, and shown the operation thereof, what I claim therein as new, and desire to secure by Letters Patent, is—

The mode in which I have combined the stationary and the revolving disks, furnished with teeth upon their surfaces, with the revolving arms carrying square, vertical rods of iron; the whole being arranged, combined, and operating, as above set forth.

LEWIS GREENE.

Witnesses:
 THOS. P. JONES,
 JOS. O. ANDREWS.